United States Patent [19]

Nishikawa

[11] 4,064,199

[45] Dec. 20, 1977

[54] CURABLE COATING COMPOSITIONS

[75] Inventor: Shigeki Nishikawa, Tokyo, Japan

[73] Assignee: Nippon Oil Company Ltd., Tokyo, Japan

[21] Appl. No.: 613,002

[22] Filed: Sept. 12, 1975

Related U.S. Application Data

[63] Continuation-in-part of Ser. No. 441,461, Feb. 11, 1974.

[30] Foreign Application Priority Data

Feb. 16, 1973 Japan .................................. 48-18325

[51] Int. Cl.$^2$ ...................... C08F 8/14; C08F 265/06; C08F 277/00
[52] U.S. Cl. ............................. 260/879; 204/159.15; 204/159.17; 204/159.22; 204/159.23; 260/885; 526/283
[58] Field of Search ................ 260/885, 879; 526/283, 526/56; 204/159.17, 159.23, 159.15, 159.22

[56] References Cited

U.S. PATENT DOCUMENTS

| 2,683,126 | 7/1954 | Nichols | 260/899 |
|---|---|---|---|
| 2,689,232 | 9/1954 | Gerhart | 260/83.5 |
| 3,552,986 | 1/1971 | Bussemir et al. | 204/159.23 |
| 3,642,750 | 2/1972 | Wagemund | 526/283 |
| 3,776,729 | 12/1973 | Levy et al. | 204/159.15 |
| 3,826,760 | 7/1974 | Takeshita et al. | 260/88.1 R |
| 3,832,421 | 8/1974 | Morgan | 260/88.1 R |

FOREIGN PATENT DOCUMENTS

| 500,809 | 3/1954 | Canada | 260/83.5 |

*Primary Examiner*—William F. Hamrock
*Attorney, Agent, or Firm*—Frank J. Jordan

[57] ABSTRACT

Coating compositions curable under the action of heat, ultraviolet rays, electronic beams or other suitable radiation, which comprise an acrylic acid- or methacrylic acid-esterified dicyclopentadiene-allyl alcohol copolymer and, if desired, at least one unsaturated monomer polymerizable therewith such as trimethylolpropane triacrylate, pentaerithritol tetracrylate or ethylene glycol diacrylate.

6 Claims, No Drawings

CURABLE COATING COMPOSITIONS

This is a Continuation-in-Part application of U.S. patent application Ser. No. 441,461 filed Feb. 11, 1974.

The present invention relates to a curable coating composition and more particularly relates to a curable coating composition comprising a resin prepared by reacting acrylic or methacrylic acid with a copolymer of dicyclopentadiene and allyl alcohol, the resin being curable singly or, if desired, in the presence of at least one reactive unsaturated or polymerizable monomer by applying heat or radiation thereto.

If there is conventionally obtained a polyolacrylic acid ester with ethylenic unsaturation or double bonds still remaining therein, the ester will never fail to have a tendency of gel formation since acrylic acid or the derivatives thereof are readily polymerizable only by applying heat thereto.

Thus, as examples of processes for the synthesis of an acrylic acid-modified or acid-esterified resin not having such tendency, there has been used a process comprising reacting epoxy groups with acrylic acid and crosslinking the produced OH groups with a polyisocyanate to obtain a resin, as described in Japanese Patent Application Public Disclosure No. 15202/72, or a process comprising reacting glycidyl acrylate with another acid such as chinawood oil fatty acid (this acid being obtained by the saponification of chinawood oil) and then crosslinking the produced OH groups with a polyisocyanate to obtain a resin, as disclosed in German Pat. No. 2,157,115.

Still now, however, it is required that the resins thus obtained be incorporated with a higher fatty acid to provide them with oleophilic property (transferability to the image area of a printing plate) and increased compatibility with solvents or washing oils for printing inks.

The present inventors have found, according to the present invention, that the reaction of a copolymer of dicyclopentadiene and allyl alcohol with acrylic or methacrylic acid will successfully give an acrylic- or methacrylic acid-esterified unsaturated resin suitable for printing inks, which resin is excellent in solubility and crosslinking capability even without the use thereof together with a poisonous isocyanate or with a higher fatty acid, which is expensive.

The polyol resin, which is one of the characteristics of the present invention, is obtained as a resin having a hydroxyl equivalent of not more than 200 since 1 mol of dicyclopentadiene (Molecular Weight, 132) can theoretically be addition reacted with about 1.1 mol of allyl alcohol (M.W., 58). This makes it possible to obtain the polyol resins wherein not less than 20% of acrylic acid-esterification ratio is achieved, the thus-obtained polyol resins consequently being capable of being easily cured by crosslinking. In addition, the acrylic acid-esterified dicyclopentadiene-allyl alcohol copolymer resins are satisfactorily compatible with aliphatic hydrocarbon-derived solvents such as Magie Oils 535, 520, 550 and 470 produced by Magie Bros. Oil Co. as well as with white kerosine.

In the preparation of a dicyclopentadiene (DCPD)-allyl alcohol copolymer which may be used in the practice of the present invention, DCPD and allyl alcohol monomers may be used in any mixing ratios and preferably in molar ratios of not less than 1 : 1, more preferably 1 : 0.5-1. It is desirable that the DCPD/allyl alcohol copolymer should have as high a hydroxyl value as possible thereby increasing the amount of acrylic or methacrylic acid used for the esterification of the copolymer. Thus, the hydroxyl value should be in the range of from 100 to 270, preferably from 150 to 250, more preferably from 200 to 250. In such a copolymer a hydroxyl value of from 200 to 250 corresponds to a molar ratio of approximately 1 : 1 between DCPD and allyl alcohol units.

A few tests were made by reacting DCPD with allyl alcohol in such molar ratios as indicated in the following Table, at 270°C under pressure for two hours, and then distilling off the unreacted monomers from the reaction mixture to obtain resins. The yield, softening point and molecular weight of each of the resins so obtained are shown in the Table.

Table

| DCPD-Allyl alcohol (molar ratio) | Yield (%) | Softening point (° C) | Molecular weight N |
|---|---|---|---|
| 3 : 1 | 72.5 | 114.5 | 800–850 |
| 2 : 1 | 67.9 | 112.5 | " |
| 1 : 1 | 53.8 | 96.5 | 750–800 |
| 1 : 2 | 28.1 | 77.0 | 700–750 |

From the Table it is clear that the use of DCPD and allyl alcohol in molar ratios of less than 1 will disadvantageously give an extremely low yield with the unreacted monomers remaining in increased amounts.

The DCPD-allyl alcohol copolymer according to the present invention may be prepared by heating DCPD and allyl alcohol in the presence or absence of a suitable catalyst and, in this case, preferable reaction temperatures are in the range of from 170° to 300° C and preferable reaction time in the range of from 30 minutes to 10 hours.

According to the present invention, the aforementioned copolymer is then reacted with acrylic or methacrylic acid to enhance its crosslinking capability and, in this case, the esterifying reaction may readily proceed under ordinary esterifying reaction conditions and, for instance, it may be effected at 80° – 130° C, preferably 90° – 120° C for 5 – 10 hours in the presence of an acid catalyst. The acrylic or methacrylic acid may be used in the same amount as the OH-group equivalents in the DCPD-allyl alcohol copolymer (that is, in such amount that the number of the carboxyl groups are the same as that of the OH groups); however, it should preferably be used in excessive amounts, for example, about 20% larger amounts than the said OH-group equivalents in view of the esterifying reaction velocity and the like. It is desirable that the acid-esterification ratio or the degree of esterification in the acid-esterified copolymer should be preferably at least 50% and more preferably at least 80% when the copolymer contains DCPD and allyl alcohol units in molar ratios of 1 : 0.5-1.

In the present invention the DCPD/allyl alcohol copolymer and acrylic or methacrylic acid may be used in amounts of 0.2 – 1.2 mols of the acid per hydroxyl group contained in the copolymer.

The acid-modified resins so obtained are highly soluble in aliphatic hydrocarbon type solvents such as Magie Oils 535, 520, 500 and 470 produced by Magie Bros. Oil Co. as well as in white kerosine.

The acrylic or methacrylic acid-esterified resin so obtained may be used jointly with a higher fatty acid or rosin if necessary to increase particularly its oleophilic property as a vehicle for printing inks. The acrylic (or methacrylic) acid-esterified resins according to the present invention may be easily cured by applying heat or radiating ultraviolet rays thereto and, in addition, they may be cured together with an unsaturated monomer which is capable of crosslinking, in order to allow them to be cured more easily. Examples of the crosslinking unsaturated monomers are trimethylolpropane triacrylate (hereinafter referred to as "TMPTA"), pentaerithritol tetracrylate (hereinafter referred to as "PETA"), ethylene glycol diacrylate, diethylene glycol diacrylate and triethylene glycol diacrylate. The crosslinking unsaturated monomer or monomers may be used in amounts by weight of 0.2 - 2.5 parts per part by weight of a mixture of DCPD/allyl alcohol copolymer and acrylic or methacrylic acid used. Cure accelerators may preferably be employed in thermally curing the resin or vehicle according to the present invention, and they include a combination of an organic peroxide and a decomposition accelerator therefor, and a certain ketonic resin (such as cyclohexanone resin), while those which may be used in curing the resin according to the present invention under the action of ultraviolet rays applied thereto include photosensitizers such as various benzoin ethers, benzophenone, acetophenone and benzil. In some particular cases the resins according to the present invention may also be effectively cured by the radiation thereon of electronic rays other than ultraviolet rays.

The present invention will be illustrated by the following examples in which all parts are by weight unless otherwise indicated.

EXAMPLE 1

To a three-necked flask were added 75 parts of a resin prepared from DCPD and allyl alcohol in the molar ratio of 1 : 1, 25 parts of acrylic acid, 0.1 part of hydroquinone and 1.0 part of p-toluenesulphonic acid to form a mixture which was reacted at 100° C under benzene reflux for approximately 15 hours. The resulting reaction mixture was then treated to distil off the benzene thereby obtaining a resin A having an acid value of 20 and a viscosity of 1200 poise at 25° C. The resin A so obtained was perfectly compatible with Magie Oil 470. Eighty parts of the resin A were dissolved in 20 parts of TMPTA to obtain a vehicle A. Using the vehicle A, inks A and B respectively having the following compositions were prepared.

| Ink A (Curable by ultraviolet rays) | | Ink B (Curable by heat) | |
|---|---|---|---|
| Lionol Blue SM (Trade mark) (Phthalocyanine pigment produced by Toyo Ink Mfg. Co.) | 18 Parts | Brilliant Carmin 6B (T) (Monoazo type pigment produced by Toyo Ink Mfg. Co.) | 16 Parts |
| Vehicle A | 62 Parts | Vehicle A | 63 Parts |
| Vaseline | 2 Parts | Wax compound* | 5 Parts |
| ATMPT | 3 Parts | Magie Oil No. 470 | 6 Parts |
| Benzophenone | 15 Parts | Cyclonox** (Peroxide produced by Kayaku Noury Corporation) | 5 Parts |
| | | Co drier (Co: 5%) | 5 Parts |
| Total | 100 Parts | Total | 100 Parts |
| Ink-O-meter value | 8.0 (400 rpm, 30° C) | Ink-O-meter value | 6.5 (400 rpm, 30° C) |
| Spread meter value | 17.8 mm/min (25° C) | Spread meter value | 18.3 mm/min (25° C) |

*A dispersion of 27 parts of microcrystalline wax in 73 parts of Magie Oil.
**Addition of peroxide was effected just before use of ink so added. This applies to the following Examples.

By means of a printability tester (RI tester produced by Akira Mfg. Co.), the ink A was used in printing art paper in such amount that 25 mg of the ink was coated on every 100 cm² of the paper. The paper so printed was then passed at a speed of 18 m/min. at a distance of 5 cm from a high pressure ultraviolet lamp (produced under the trade mark of H 2000 L by Toshiba, Japan) thereby thoroughly drying the ink coated on the paper.

Following the same procedure as above, but substituting the ink A by the ink B, art paper was printed. The paper so printed was then placed in an electric oven at 230° C for 4 seconds thereby thoroughly setting the ink coated thereon.

EXAMPLE 2

Following the same procedure as in Example 1, an esterification reaction was effected using 80 parts of a resin prepared from DCPD and allyl alcohol in the molar ratio of 1 : 0.8, 20 parts of acrylic acid, 0.1 part of hydroquinone and 1 part of p-toluenesulphonic acid to thereby obtain a resin B having an acid value of 18 and a viscosity of 2,600 poise at 25° C. The resin B so obtained was entirely compatible with a mixture of an alkylbenzene (such as dodecylbenzene) and Magie Oil No. 530 in the ratio by part of 1 : 1. Seventy-three parts of the resin B were dissolved in 27 parts of TMPTA to obtain a vehicle B. Using the vehicle B and a vehicle C which was prepared by dissolving 50 parts of a cyclohexanone resin (produced under the trade name of Hilac No. 222 by Hitachi Chemical Company Limited, Japan) in 50 parts of TMPTA, there was prepared an ink C having the following composition.

| Ink C | |
|---|---|
| Regal 33OR (Produced by Columbia Carbon Co.) | 23 Parts |
| Vehicle B | 52 Parts |
| Vehicle C | 20 Parts |
| Dodecylbenzene | 5 Parts |
| Total | 100 Parts |
| Ink-O-meter value | 16 (400 rpm, 30° C) |
| Spread meter value | 17 mm/min (25° C) |

Following the same procedure as in Example 1, the ink C was used in printing on a tin plate in the amount of 30 mg/100 cm². The tin plate so printed was placed in an oven at 150° C for about 3 minutes thereby obtaining a thoroughly dried coating of the ink on the plate.

EXAMPLE 3

Following the procedure of Example 1, but substituting the acrylic acid by methacrylic acid, there was obtained a resin C having an acid value of 15 and a viscosity of 1,000 poise/25° C. A vehicle was prepared by dissolving 50 parts of the thus-obtained resin in 50 parts of diethylene glycol diacrylate. The vehicle so obtained was used in the preparation of an ink D as one component thereof in the same manner as used in Example 1.

Under the same conditions as in Example 1, art paper was printed with the ink D, and the thus-printed paper was then passed at a speed of 18 m/min below the ultraviolet lamp thereby setting the coating of the ink on the paper. When such printed paper was passed at a speed of 12 m/min., the coating formed thereon was thoroughly dried.

EXAMPLE 4

Seventy parts of a resin prepared by reacting DCPD with allyl alcohol in the molar ratio of 1 : 1, were reacted with 10 parts of linseed oil fatty acid at 230° C to form a resin having an acid value of not more than 5 which was then esterified using 20 parts of acrylic acid, 1.5 parts of p-toluenesulphonic acid and 0.1 part of hydroquinone in the same manner as in Example 1 to obtain a resin D having an acid value of 13 and a viscosity of 750 poise at 25° C. The resin D so obtained was one which was perfectly compatible with Magie Oil No. 530. Sixty-five parts of the resin D were dissolved in 35 parts of ATMPT to form a vehicle which was then used in preparing an ink E in the same manner as in the ink A of Example 1. A sample of the ink E thus prepared was coated on art paper under the same printing conditions as in Example 1, and the printed paper was subjected to the radiation of ultraviolet rays with the result that the coating on the paper was dried by passing at a speed of 15 m/min. below the ultraviolet lamp. Separately, another sample of 100 parts of the ink E, kneaded with benzil in the amount of 3% by weight of the ink sample, was likewise tested and found to dry by passing at a speed of 25 m/min. below the lamp.

What is claimed is:

1. A coating composition useful as a vehicle for printing inks and curable by the application of heat or radiation thereto, comprising an acid-esterified resin prepared by reacting a dicyclopentadieneallyl alcohol copolymer with a member selected from the group consisting of acrylic and methacrylic acids in amounts of 0.2 – 1.2 mols of the acid per hydroxyl group contained in the copolymer.

2. A coating composition according to claim 1, further comprising 0.2 – 2.5 parts by weight of at least one unsaturated monomer polymerizable with said acid-esterification resin per part by weight of a mixture of said copolymer and said acid.

3. A coating composition according to claim 2, wherein the unsaturated monomer is selected from the group consisting of trimethylolpropane triacrylate, pentaerithritol tetracrylate, ethylene glycol diacrylate, diethylene glycol diacrylate and triethylene glycol diacrylate.

4. A coating composition according to claim 1, further comprising as the thermal cure accelerator a member selected from the group consisting of a combination of an organic peroxide with a decomposition accelerator therefor and cyclohexanone resins.

5. A coating composition according to claim 1, further comprising as the photosensitive agent a member selected from the group consisting of benzoin ethers, benzophenone, acetophenone and benzil.

6. A vehicle for printing inks which is curable by the application of heat or radiation thereto, comprising an acid-esterified resin prepared by reacting a dicylopentadieneallyl alcohol copolymer with a member selected from the group consisting of acrylic and methacrylic acids in amount of 0.2 – 1.2 mols of the acid per hydroxyl group contained in the copolymer.

* * * * *

UNITED STATES PATENT AND TRADEMARK OFFICE
CERTIFICATE OF CORRECTION

PATENT NO. : 4,064,199
DATED : December 20, 1977
INVENTOR(S) : Shigeki NISHIKAWA It is certified that error appears in the above-identified patent and that said Letters Patent are hereby corrected as shown below:

Add the second assignee -- Toyo Ink Manufacturing Co., Ltd.-- to indicate that the patent has been assigned to "Nippon Oil Co., Ltd. and Toyo Ink Manufacturing Co., Ltd."

Signed and Sealed this

Thirtieth Day of May 1978

[SEAL]

Attest:

RUTH C. MASON
Attesting Officer

LUTRELLE F. PARKER
Acting Commissioner of Patents and Trademarks